Jan. 28, 1930.   C. W. JEAN   1,745,219
DUPLICATING MACHINE OR COPYGRAPH AND METHOD OF OPERATING SAME
Filed Oct. 11, 1928   3 Sheets-Sheet 1

INVENTOR
Charles Wesley Jean
BY
ATTORNEYS

Jan. 28, 1930.　　　　　C. W. JEAN　　　　　1,745,219
DUPLICATING MACHINE OR COPYGRAPH AND METHOD OF OPERATING SAME
Filed Oct. 11, 1928　　　3 Sheets-Sheet 2
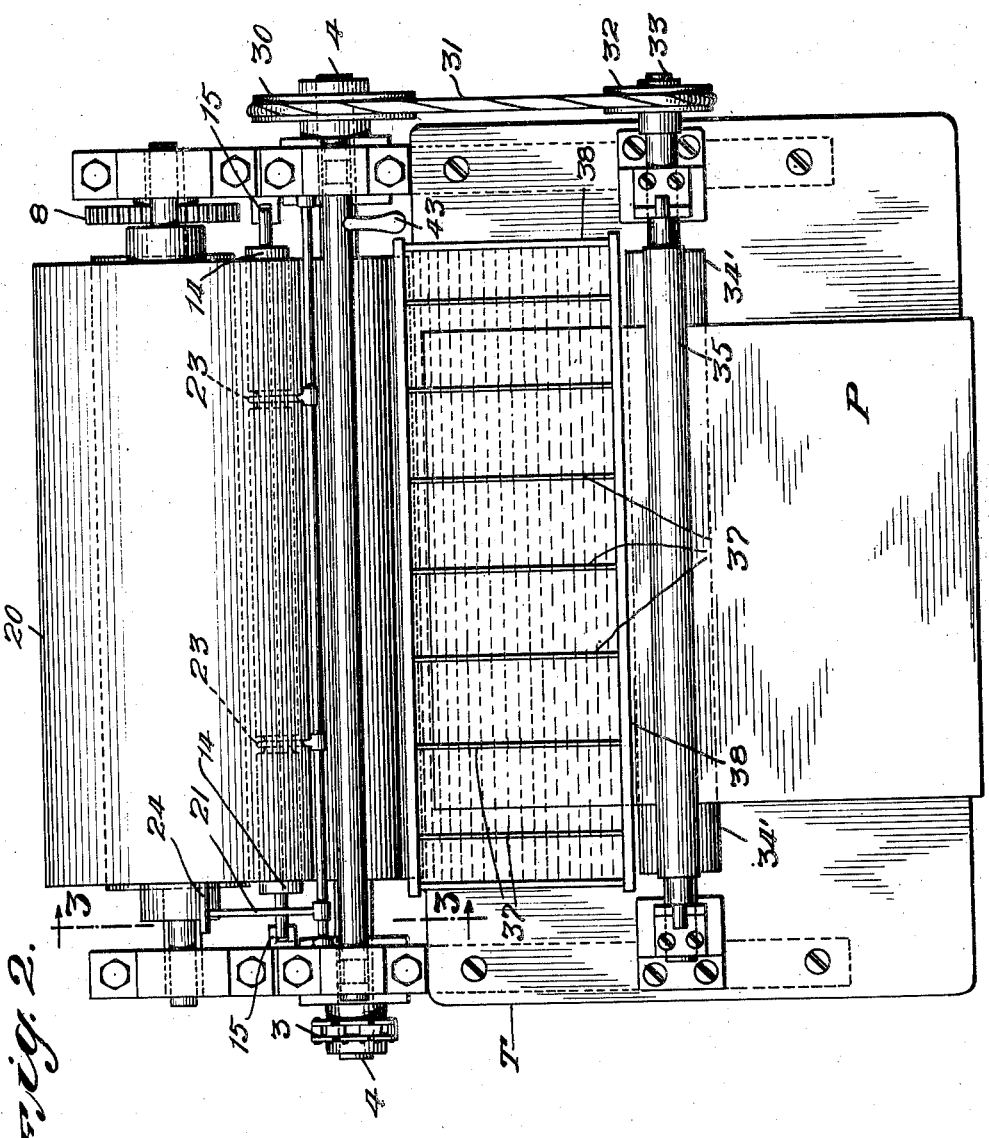
INVENTOR
Charles Wesley Jean
BY
Modet Hum
ATTORNEYS Jan. 28, 1930.  C. W. JEAN  1,745,219
DUPLICATING MACHINE OR COPYGRAPH AND METHOD OF OPERATING SAME
Filed Oct. 11, 1928  3 Sheets-Sheet 3
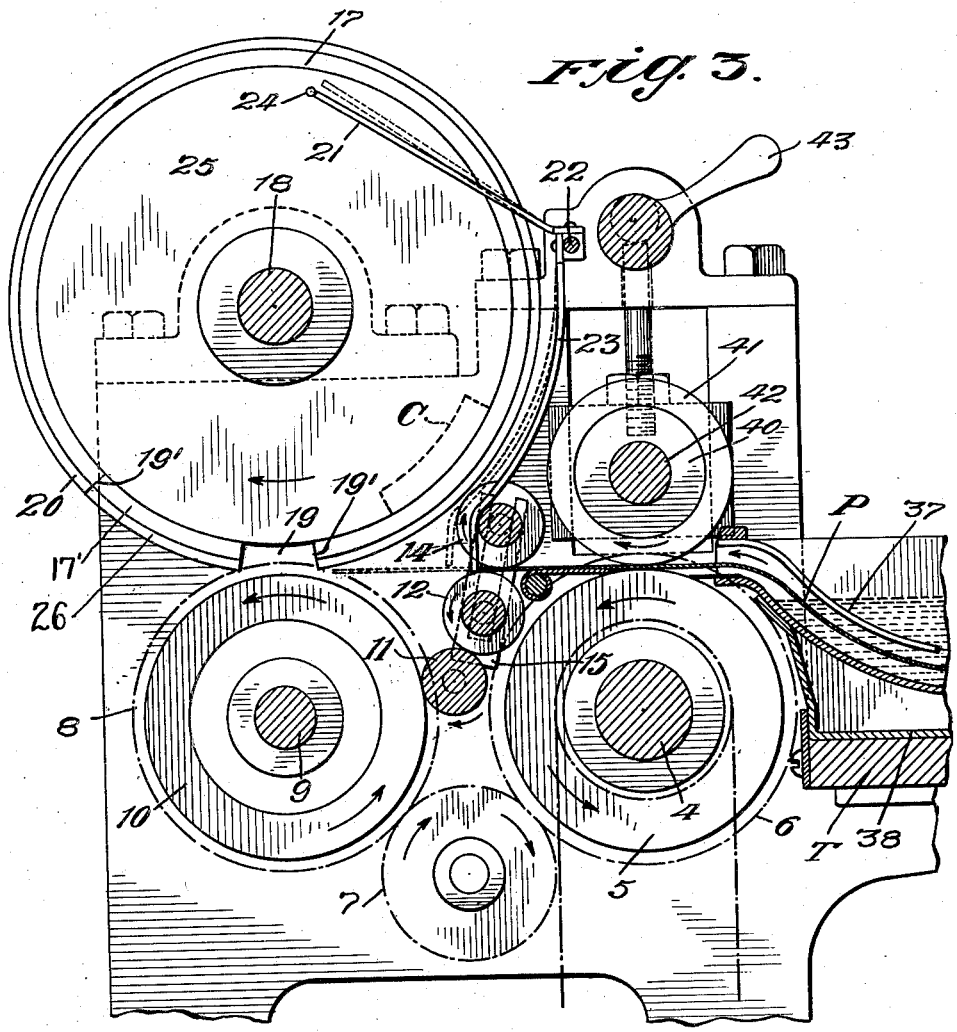
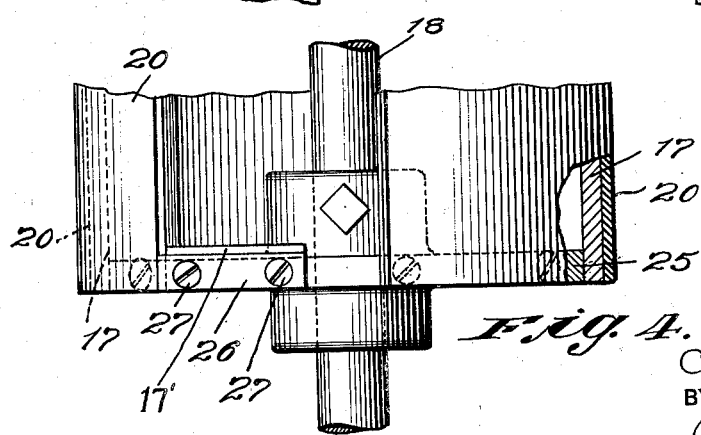
INVENTOR
Charles Wesley Jean
BY
ATTORNEYS Patented Jan. 28, 1930

1,745,219

UNITED STATES PATENT OFFICE

CHARLES WESLEY JEAN, OF FLUSHING, NEW YORK

DUPLICATING MACHINE OR COPYGRAPH AND METHOD OF OPERATING SAME

Application filed October 11, 1928. Serial No. 311,774.

My invention relates to a new and improved duplicating machine or copygraph, and an improved method of operating the same.

One of the objects of my invention is to provide a method for controlling the copying machine by means of the movement of the sheet or sheets upon which the copygram or duplicate is made.

Another object of my invention is to provide an improved copying or duplicating machine which can be very simply thrown into operation or out of operation and which will permit great ease and rapidity of operation.

Another object of my invention is to provide a copying or duplicating machine which will eliminate the necessity of using clutches or the like for putting the machine into operation or out of operation.

Another object of my invention is to moisten the paper on which the copy is made, in the form of separate sheets, and to then form the copies on said separate sheets to avoid the necessity of using a continuous web or paper.

Other objects of my invention will be set forth in the following description and drawings which illustrate a preferred embodiment thereof, it being understood that the above general statement of the objects of my invention is intended merely to generally explain the same and not to limit it in any manner.

Fig. 2 is a plan view of the machine shown in Fig. 1.

Fig. 3 is a sectional view on the line 3—3 of Fig. 2.

Fig. 4 is a detail bottom view of the master drum.

Figure 1:
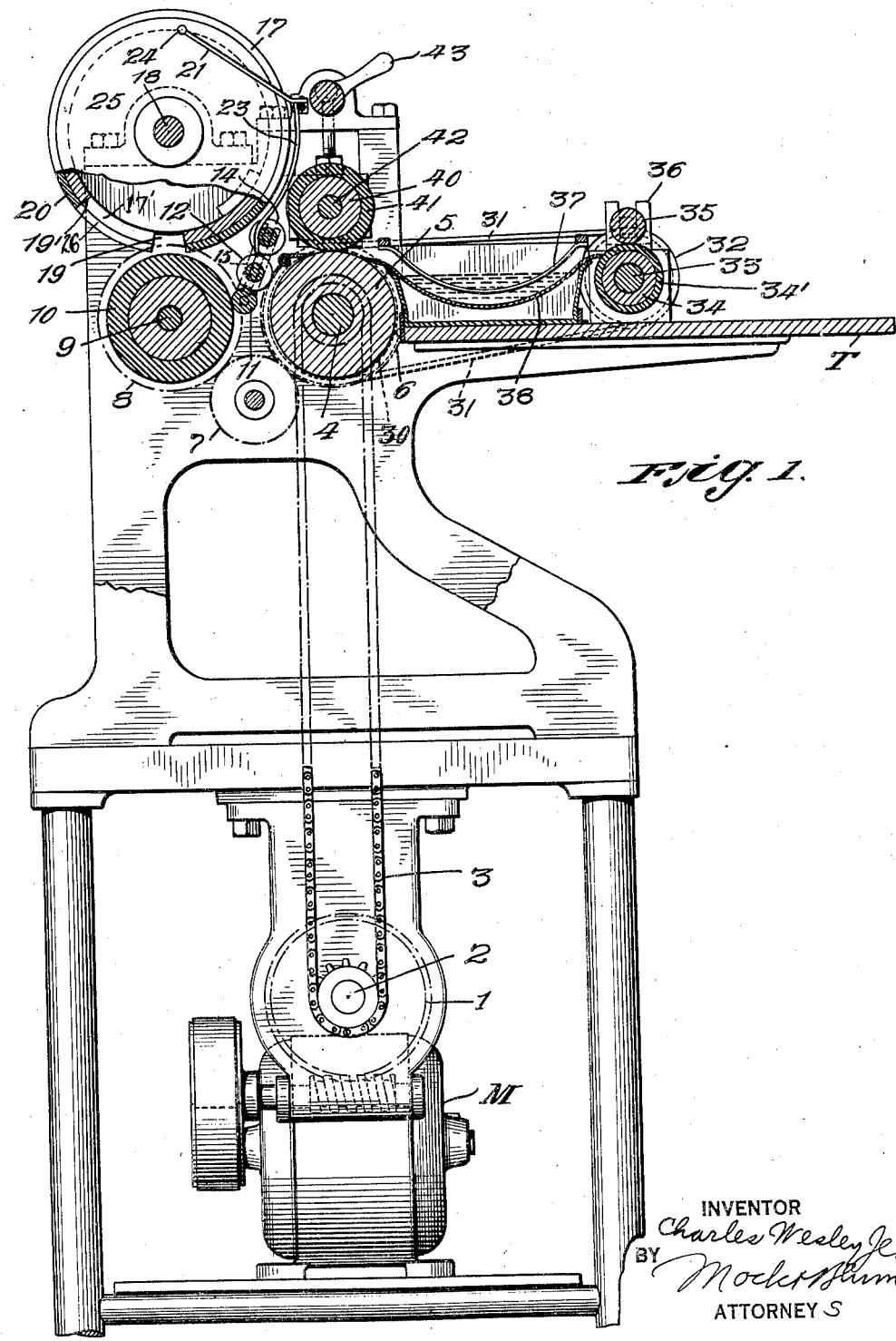
Fig. 1 is a side view partially in section, one side of the machine being represented as being broken away, to more clearly illustrate the parts.

The essential parts of the machine are mounted upon a suitable support having a table T.

An electric motor M has a worm drive for turning the gear 1 mounted on the shaft 2. The shaft 2 has a sprocket which is connected by a chain 3 to a sprocket on the shaft 4. A roller 5 made of brass or other suitable material is mounted upon the shaft 4 so as to turn therewith. The shaft 4 has a gear 6 meshing with intermediate gear 7, which meshes with gear 8 on shaft 9.

A rubber roller 10 is mounted on shaft 9 so as to turn therewith and this rubber roller 10 frictionally drives the rubber roller 11 mounted upon a suitable shaft. The rubber roller 11 frictionally drives the lower feed roller 12 which is made of any suitable metal, and which frictionally drives the co-operating metal feed roller 14.

As shown in detail in Fig. 3, the shafts of the metal feed rollers 12 and 14 are slidably mounted in a fork 15, and the weight of said rollers 12 and 14 is sufficient to cause them to be frictionally driven by the rubber roller 11.

The copy or master roller 17 comprises a cylinder having separated ends so as to provide a gap 19 having end walls 19'. The master roller 17 is provided with a resilient covering 20 which is made of rubber or other suitable material. The ends of the covering 20 extend to the walls 19'.

When the resilient peripheral layer 20 is in contact with the roller 10, a frictional drive is provided which turns the master roller 17 in the direction of the arrow shown in Fig. 3.

However, when the gap or opening 19 of the master roller is adjacent the drive roller 10, the frictional drive for the master roller 17 is inoperative.

The master roller 17 is provided with disc-like end flanges 25, one of which is provided with a stop pin 24. A latch lever having arms 21 and 23 is pivotally mounted at 22 to the frame of the machine. When the arm 21 of the latch lever is in the position represented in Fig. 3 by full lines, the latch lever operates to stop the movement of the master roller 17. When the arm 21 of the latch lever is in the dotted line position illustrated in Fig. 3, the master roller 17 is free to resume its movement.

As shown in detail in Fig. 3, the bottom ends of the arms 23 of the latch lever fit in grooves of the feed roller 14. Hence, the bottom end of each said arm 23 is very close to the line of contact between the rollers 12 and 14.

When the stop pin 24 is released by the latch lever, a weight C located upon the interior of the master drum operates to turn the said drum sufficiently, to render the frictional drive of the drive roller 10 operative.

As shown in Fig. 4, the end portions of the hollow roller 17 are provided with lateral or circumferential extensions 17' between the walls 19' and said extensions 17' which have the same thickness as the wall of said hollow roller 17. Supplemental drive members 26 made of metal or other suitable material are connected to these extensions 17' by means of screws 27. These supplemental drive members 26 serve to diminish the width of the gap 19, to facilitate the friction drive by the roller 10.

As shown in Fig. 2, the shaft 4 has a pulley 30 provided with a belt 31 which drives pulley 32 mounted on shaft 33. As shown in Fig. 1, the shaft 33 has a feed roller 34 mounted thereon, and this is provided with a rubber covering layer 34' which operates to frictionally drive the upper feed roller 35. This upper feed roller 35 has its shaft slidably mounted in a fork 36 and the weight of the upper feed roller 35 is sufficient to cause it to be frictionally driven by the lower roller 34.

The feed roller 5 mounted on the shaft 4, co-operates with an upper feed roller 40 having a rubber sleeve 41, and mounted on the shaft 42. Suitable means 43 of any well known type may be provided for exerting a downward pressure upon the shaft 42, to cause the roller 40 to be frictionally driven by the roller 5. Likewise, the moistened paper is subjected to considerable pressure between the rollers 5 and 40, in order to squeeze out as much moisture as possible from the previously moistened paper. Experience has shown that when separate sheets of relatively thick paper are moved through the moistening tank, that the moisture collects upon the surface of the paper in the form of beads. This causes the copy to be blurred. However, the pressure exerted by the rollers 5 and 40, and the pressure subsequently exerted during the copying operation produces a clear copy and the sheet of paper, while slightly damp, requires no additional drying operation.

The operation of the machine is as follows:

A master sheet containing the matter to be duplicated is mounted upon the rubber sleeve 20 of the master drum 17. This can be done by means of suitable strips of glued paper or the like. The edges of the master sheet do not extend beyond the walls 19'.

This master sheet (not shown in the drawings) contains the matter to be copied marked thereon by means of a suitable copying ink, and it is preferably a negative so that a positive will be duplicated upon the sheets of paper fed through the machine. A master sheet made with the use of copying or hectograph ink may be defined as a "hectograph" sheet. This negative can be formed by using an ordinary typewriter. The sheet of copy paper P is initially fed between the first pair of feed rollers 34 and 35. Its forward end is guided by means of the fingers 37 into the water contained in the trough 38, having a curved bottom, as shown for example in Fig. 1. Since the fingers 37 are made of metal, they do not prevent the absorption of water by the surface of the paper. Furthermore, each sheet of copy paper is pushed through the tank 38, instead of being pulled through by belts or cords, so that the device is very simple. As shown in Fig. 3, the point at which the rollers 5 and 40 grip each moist sheet of copy paper to pull it away from the tank, is below the tops of fingers 37. Hence the inner portion of each sheet, during a portion of its travel through the moistening bath, is free from contact with the fingers 37, so that it contacts solely with the liquid. This inner portion of the sheet has the copy formed thereon. This causes the surface of each sheet of paper, and especially its anterior portion, to be effectively moistened, which is desirable in producing a clear and uniform copy. Likewise, it is a decided advantage to eliminate the necessity of stripping the moist copy paper from string or belt conveyors.

The sheet of paper is thus forced through the water in said trough 38 until its front edge is gripped by the second pair of feed rollers 5 and 40. Since the rollers 5 and 40 exert high pressure upon the sheet of paper, to squeeze out the excess moisture therefrom, a film of water tends to accumulate upon the periphery of the sleeve of the upper roller 40. Any suitable doctor blade (not shown) made of celluloid or other suitable material can be used for removing the film of moisture and leading it back to the tank. The front edge of the sheet of paper is now fed forwardly over a suitable table member, which is shown in Fig. 3, until it is gripped by the third pair of feed rollers 12 and 14. The front edge of the sheet of moist paper P then strikes against the bottom of each arm 23 of the latch lever, and it is sufficiently stiff to turn said latch lever, until the arm 21 thereof releases the stop pin 24. It is highly advantageous to have the bottom of each arm 23 of the latch lever very close to the point of contact between the feed rollers 12 and 14, so that only a very short portion of the sheet of paper P is free from the third pair of feed rollers 12 and 14, before it strikes the arms 23 of the latch lever.

When the stop pin 24 is released the weight

C turns the master drum 17 until it is frictionally driven by the drive roller 10, thus duplicating the material to be copied upon the sheet of paper P.

If a continuous succession of sheets P is fed through the machine, the master roller 17 is continuously operated. As soon as the feed of the paper is interrupted, the friction drive of the master roller 17 is forthwith interrupted.

Hence, it is clear that a very simple, quick and automatic control of the machine is provided.

While I have shown my invention as applied to one type of duplicating machine, I do not wish to be restricted to this specific type as this is only illustrative of the application of my invention, and many of the features of my invention could be applied to various types of duplicating machines. Likewise, while I prefer to moisten the paper before it operates the control mechanism, the invention is not necessarily restricted in all of its aspects to this sequence of steps.

Heretofore, in making copies by the hectograph or letter-press method upon moistened paper, it was necessary to feed the moistened paper through the machine in the form of a continuous web. This required the use of special paper because ordinary paper would tear when it was lead through the machine in the moistened and taut condition. Likewise, the use of a continuous web of paper made it impossible to produce copies upon letter-heads and the like so that it was necessary to use copying machines of the stencil type for this purpose.

For the purposes of this invention guide fingers 37 in association with the feed rollers anterior and posterior to the tank 38, can be considered as feeding means for feeding separate sheets of paper successively into and away from the moistening tank.

The master sheet which can be secured to the drum 17 can be conveniently prepared by typing on the front of said sheet while the back thereof is in contact with a hectograph copying sheet. The back of the sheet then has a negative of the typewritten matter which appears upon the front of the sheet, formed on said back by means of the hectograph or copying ink. The master sheet thus prepared is then secured to the master roller 17 with the negative or reverse of the matter to be copied upon the outside surface thereof. Hence, when copies are formed upon the sheets of paper P, these copies will be positives.

As shown in Fig. 3, the front or advancing end of the sheet of copy paper is not pushed along a long fixed surface. On the contrary, said front end is substantially free save to the extent that it rests upon the feed roller 12 which is moving at the same speed as the sheet of wet paper. Hence, the sheet of wet paper is not caused to wrinkle. It will likewise be noted that the latch member 21 holds the drum or copy roller 17 in unstable equilibrium. That is, if the member 21 is pushed even slightly away from the full line position shown in Fig. 3, the rounded pin 24 completes the operation. Hence, it is necessary to only exert very gentle pressure upon the members 23 in order to release the device. This is highly important because when a thin sheet of wet copy paper is pushed against the members 23 it cannot exert much pressure. As shown in Fig. 3, for example, the angle between the member 21, and a radius of the end face of the drum passing through pin 24, is less than ninety degrees. Likewise, when the advancing sheet of paper causes the movement of member 21, said member 21 is turned upwardly. The smooth end of member 21 contacts with the stop pin 24. Since the pivot of member 21 is below the stop pin 24, when said pin is in the operative position, the pressure of pin 24 against the member 21, which is produced by weight C, tends to turn member 21 upwardly or in the clockwise direction. The friction between the smooth round pin 24, and the smooth end of member 21, is necessarily very slight. The weight of arms 23 and of member 21 normally keeps member 21 in the stop or operative position shown in Fig. 3.

I have shown a preferred embodiment of my invention, but it is clear that numerous changes and omissions could be made without departing from the spirit of my invention.

Thus, it would not be departing from my invention to use a spraying or other moistening device instead of the tank, although the use of a tank is superior, and is preferred.

I claim:—

1. In a copying machine of the type having a master roller having a discontinuous periphery on which roller a hectograph master sheet is mounted, a friction roller adapted to drive said master roller at the periphery thereof, so that the friction drive thus provided is inoperative when the discontinuous portion of said master roller is adjacent said friction roller, means associated with said master roller and adapted to turn it to cause the periphery thereof to contact with said friction roller to render said drive operative, and control means adapted to control the turning of said master roller and operable by the passage of copy paper through the machine, and means adapted to moisten the paper before it contacts with said control means.

2. In a copying machine, a master roller having a discontinuous periphery, a friction roller adapted to drive said master roller at the periphery thereof, so that the friction drive thus provided is inoperative when the discontinuous portion of said master roller is adjacent said friction roller, means associated with said master roller and adapted to turn it to cause the periphery thereof to contact with said friction roller to render said drive operative, a stop pin connected to said master roller, a latch lever having two arms, one of said arms being adapted to contact with said stop pin to stop the turning of said master roller when the friction drive is inoperative, and feeding means associated with the other arm of said latch lever to cause a sheet of paper to be fed against said second arm to turn said latch lever to the release position.

3. In a copying machine, the combination of a tank containing liquid, feeding means adapted to feed successive and separate sheets of paper to said tank and away from said tank, and stationary guide means associated with said tank and adapted to cause said sheets of paper to absorb the liquid in said tank, and impression means adapted to form impressions on the moistened sheets of paper.

4. In a copying machine, the combination of a tank adapted to contain liquid, and feeding mechanism adapted to feed successive and separate sheets of paper into contact with said liquid and away from said tank, said feeding mechanism including stationary guide fingers associated with said tank, and impression means adapted to form impressions on the moistened sheets of paper.

5. In a copying machine, the combination of a tank having a pair of feed rollers anterior thereto, and a second pair of feed rollers posterior thereto and curved guide fingers connected to said tank and adapted to guide the movement of a sheet of paper between said pairs of feed rollers, and impression means adapted to form impressions on the moistened sheets of paper.

6. In a copying machine of the type in which a hectograph master sheet is mounted on a master roller, a friction drive therefor, latch mechanism adapted to stop the movement of said master roller, release means associated with said latch mechanism and adapted to move said latch mechanism to inoperative position, and feed means adapted to force the advancing edge of a sheet of paper against said release mechanism to operate the same while said advancing edge is unsupported on a fixed support, and means adapted to moisten the sheets of paper before they are engaged by the feed means.

7. In a copying machine, a master roller, a pin movable with said master roller, a lever having its end adapted to contact with said pin to stop the movement of said roller, a friction drive for said roller, means adapted to feed paper against said lever to move it from the position before mentioned, and means independent of said friction drive and connected to said roller and adapted to urge it away from the position in which it is engaged by the end of the lever.

8. In the art of hectograph duplicating, that step which consists in utilizing the movement of individual moist sheets relative to the master sheet to operate control mechanism which governs the application of the hectographic master sheet to said individual moist sheets of copy paper.

9. In a duplicating machine of the type having a master roller on which a hectograph master sheet is mounted, drive means adapted to continuously actuate said roller, control mechanism adapted to control the movement of said roller by said drive means, and means adapted to feed and moisten separate sheets of copy paper, the movement of the separate sheets of moist copy paper through the machine being adapted to operate said control mechanism.

10. In the art of forming copies on separate sheets of moist paper by means of a hectograph master sheet, those steps which consist in pushing the said separate sheets into and out of a tank containing a moistening liquid and pulling each said sheet of paper away from said tank before the pushing action on said sheet of paper is stopped.

11. In the art of forming copies on separate sheets of moist paper by means of a hectograph master sheet, those steps which consist in pushing said separate sheets into and out of a tank containing a moistening liquid and pulling each said sheet of paper away from said tank before the pushing action on said sheet of paper is stopped, and subjecting each said sheet to sufficient pressure to remove surplus moisture therefrom, before the copy is formed.

12. In the art of forming copies on separate sheets of moist paper by means of a hectograph master sheet, those steps which consist in moistening said separate sheets by moving each said sheet through a tank of liquid while keeping the inner copy portion of each said sheet free from contact with anything save said liquid during its movement through said tank.

13. In a copying machine of the type which has a revoluble master roller on which a hectograph master sheet is mounted, drive mechanism adapted to continuously turn said roller, control means adapted to control the movement of said roller, means adapted to feed separate sheets of copy paper into operative relation with said control means to intermittently operate the same, and means adapted to moisten said copy sheets before they contact with said master sheet.

In testimony whereof I affix my signature.

CHARLES WESLEY JEAN.